United States Patent
Laufer et al.

(10) Patent No.: US 12,003,447 B2
(45) Date of Patent: Jun. 4, 2024

(54) NON-LINEARITY ESTIMATION FOR ENVELOPE TRACKING PA

(71) Applicant: QUALCOMM Incorporated, San Diego, CA (US)

(72) Inventors: Yaron Laufer, Brookline, MA (US); Gideon Shlomo Kutz, Ramat Hasharon (IL); Amit Bar-Or Tillinger, Tel-Aviv (IL); Elad Meir, Ramat Gan (IL)

(73) Assignee: QUALCOMM Incorporated, San Diego, CA (US)

( * ) Notice: Subject to any disclaimer, the term of this patent is extended or adjusted under 35 U.S.C. 154(b) by 213 days.

(21) Appl. No.: 17/648,805

(22) Filed: Jan. 24, 2022

(65) Prior Publication Data
US 2023/0239092 A1 Jul. 27, 2023

(51) Int. Cl.
*H04L 5/00* (2006.01)
*H04L 27/36* (2006.01)

(52) U.S. Cl.
CPC .......... *H04L 5/0048* (2013.01); *H04L 5/0067* (2013.01); *H04L 5/0073* (2013.01); *H04L 27/367* (2013.01)

(58) Field of Classification Search
None
See application file for complete search history.

(56) References Cited

U.S. PATENT DOCUMENTS

| | | | | |
|---|---|---|---|---|
| 2014/0213196 | A1* | 7/2014 | Langer | H03G 1/00 455/73 |
| 2015/0326327 | A1* | 11/2015 | Carlsson | H03F 3/195 375/224 |
| 2016/0249300 | A1* | 8/2016 | Tsai | H04B 17/13 |
| 2017/0195972 | A1* | 7/2017 | Drogi | H03F 3/191 |
| 2019/0319583 | A1* | 10/2019 | El-Hassan | H03F 3/245 |
| 2021/0105729 | A1* | 4/2021 | Park | H03F 3/245 |

* cited by examiner

*Primary Examiner* — Diane L Lo
(74) *Attorney, Agent, or Firm* — Procopio, Cory, Hargreaves & Savitch LLP/Qualcomm Incorporated

(57) ABSTRACT

A base station may identify one or more signaling messages or pilots usable for identifying a combined PA and ET non-linearity model associated with the base station. The combined PA and ET non-linearity model may be associated with a PA circuitry and an ET circuitry. The PA circuitry and the ET circuitry may be associated with the base station. The base station may transmit, to the UE, and the UE may receive, from the base station, the one or more signaling messages or pilots. The UE may identify a combined PA and ET non-linearity model associated with the base station based on the one or more signaling messages or pilots. The UE may compensate for a distortion in one or more subsequent signals from the base station based on the identified combined PA and ET non-linearity model.

27 Claims, 12 Drawing Sheets

NON-LINEARITY ESTIMATION FOR ENVELOPE TRACKING PA

TECHNICAL FIELD

The present disclosure relates generally to communication systems, and more particularly, to estimation of a combined non-linearity model associated with power amplification and envelope tracking (ET) in a wireless communication system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may receive, from a base station, one or more signaling messages or pilots. The apparatus may identify a combined power amplifier (PA) and ET non-linearity model associated with the base station based on the one or more signaling messages or pilots. The apparatus may compensate for a distortion in one or more subsequent signals from the base station based on the identified combined PA and ET non-linearity model. The distortion may be associated with a PA circuitry and an ET circuitry. The PA circuitry and the ET circuitry may be associated with the base station.

In an aspect of the disclosure, a method, a computer-readable medium, and an apparatus are provided. The apparatus may be a base station. The apparatus may identify one or more signaling messages or pilots usable for identifying a combined PA and ET non-linearity model associated with the base station. The combined PA and ET non-linearity model may be associated with a PA circuitry and an ET circuitry. The PA circuitry and the ET circuitry may be associated with the base station. The apparatus may transmit, to a UE, the one or more signaling messages or pilots.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
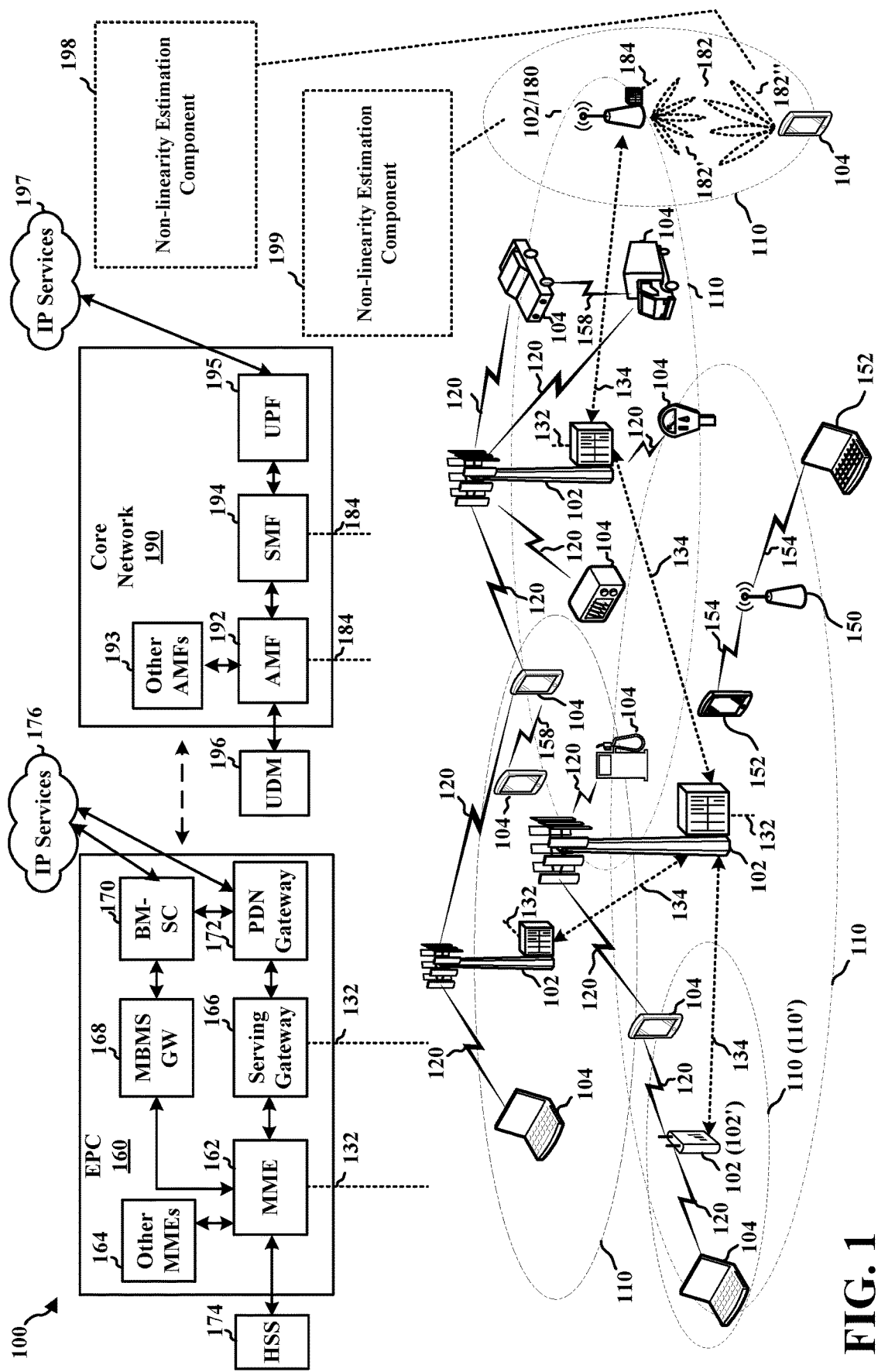
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a non-linearity estimation component 198 that may be configured to receive, from a base station, one or more signaling messages or pilots. The non-linearity estimation component 198 may be configured to identify a combined PA and ET non-linearity model associated with the base station based on the one or more signaling messages or pilots. The non-linearity estimation component 198 may be configured to compensate for a distortion in one or more subsequent signals from the base station based on the identified combined PA and ET non-linearity model. The distortion may be associated with a PA circuitry and an ET circuitry. The PA circuitry and the ET circuitry may be associated with the base station. In certain aspects, the base station 180 may include a non-linearity estimation component 199 that may be configured to identify one or more signaling messages or pilots usable for identifying a combined PA and ET non-linearity model associated with the base station. The combined PA and ET non-linearity model may be associated with a PA circuitry and an ET circuitry. The PA circuitry and the ET circuitry may be associated with the base station. The non-linearity estimation component 199 may be configured to transmit, to a UE, the one or more signaling messages or pilots. Although the following description may be focused on 5G NR, the concepts described herein may be applicable to other similar areas, such as LTE, LTE-A, CDMA, GSM, and other wireless technologies.

Figure 2:
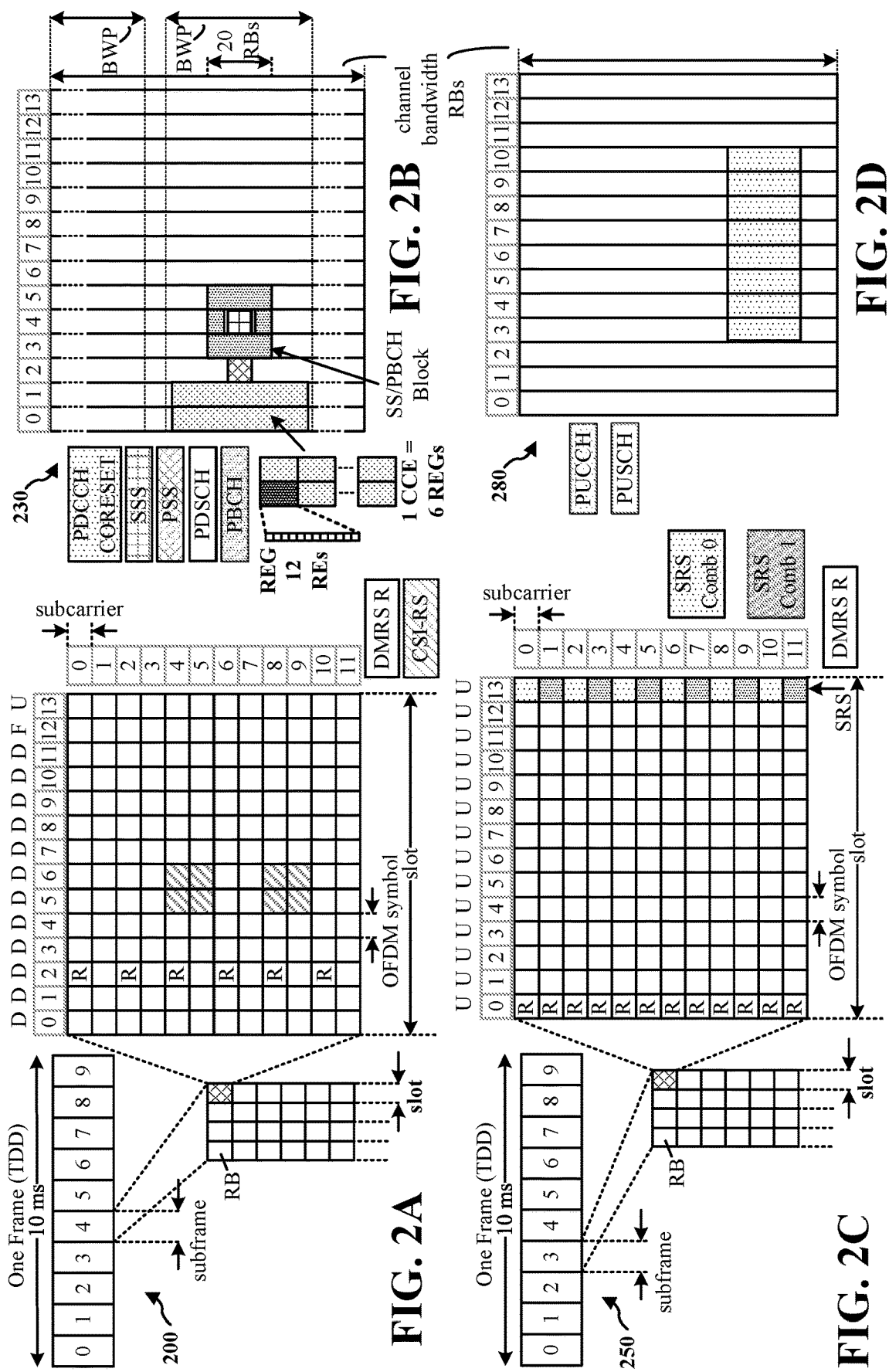
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS<br>$\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
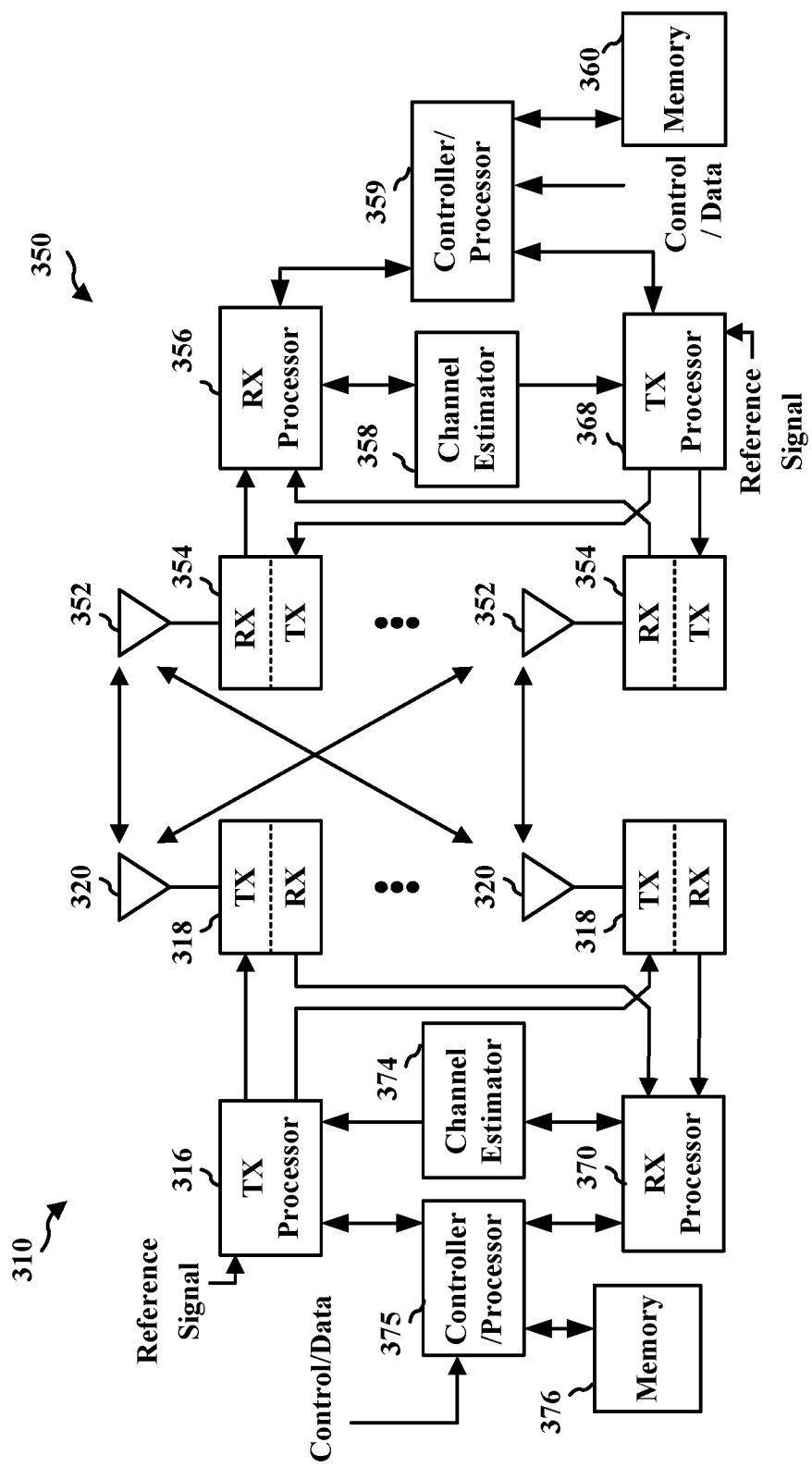
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

PAs are major contributors to the overall TX power consumption. For example, the PA may be responsible for, e.g., 50%-70% of the overall base station power consumption. In order to save power and/or enable more power efficient operating modes, various PA power supply adaptation modes may be used.

Figure 4:
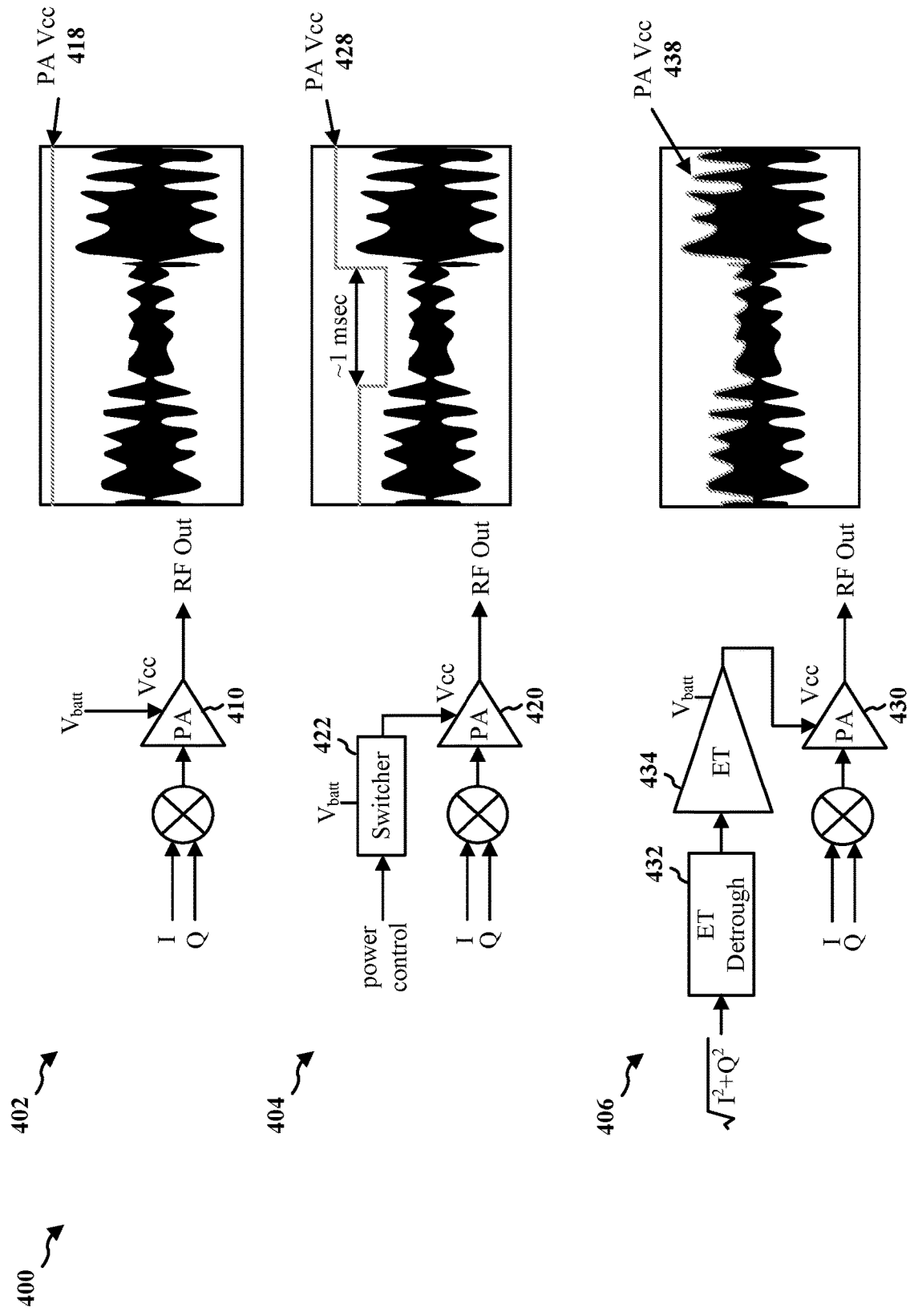
FIG. 4 is a diagram illustrating various example PA power supply adaptation modes.

FIG. 4 is a diagram 400 illustrating various example PA power supply adaptation modes. The diagram 402 illustrates the direct battery power supply mode. While operating in the direct battery power supply mode, the wireless device (e.g., the base station) may not apply an efficient bias to the PA

410. For example, the battery voltage (e.g., $V_{batt}$) may be directly provided as a fixed PA supply voltage 418 (e.g., $V_{CC}$) for the PA 410 to amplify an upconverted RF signal (which may include an in-phase (I) component and a quadrature (Q) component) regardless of the signal to be amplified. Since the PA supply voltage 418 may be greater than the signal peaks of the RF signal to be amplified, to avoid clipping, the battery voltage of the wireless device in the direct battery power supply mode may be a constant high value. As a result, excess current may be drawn in the PA 410 and dissipated as wasted energy when the PA 410 operates in the direct battery power supply mode. Accordingly, the direct battery power supply mode may provide little or no reduction in the power consumed by the PA and may have some non-linearity, which may result in wasted power.

The diagram 404 illustrates the average power tracking (APT) mode and/or the enhanced power tracking (EPT) mode. APT and/or EPT may reduce power wastage by the PA 420, as compared to the direct battery power supply mode, by adjusting the supply voltage 428 to the PA 420 (e.g., $V_{CC}$) (e.g., at a switcher unit 422) based on the transmit power of the signal to be amplified on, for example, a per slot or per subframe basis. For instance, as illustrated, the supply voltage 428 to the PA 420 may be adjusted at a finite time granularity of every millisecond (ms). In the APT mode, the supply voltage 428 to the PA 420 may be adjusted based on the average transmit power of the signal to be amplified. In this manner, the supply voltage 428 to the PA 420 may cause the PA 420 to operate close to the compression point, thereby improving efficiency. During the APT mode of operation, the PA 420 may operate in a linear mode of operation, with the bias 428 to the PA 420 varying as a function of the transmit power.

The EPT mode may further reduce power wastage and increase efficiency of the PA 420 compared to the APT mode. Operations in the EPT mode may also involve adjusting the PA supply voltage 428 based on the average transmit power of the RF signal to be amplified, similar to in APT mode; however, in the EPT mode, the PA supply voltage 428 (e.g., $V_{CC}$) may be reduced to below the compression point of the PA 420. This may cause a loss of linearity at the PA 420. The EPT mode operation may adjust for this distortion/non-linearity using digital pre-distortion. In an EPT mode, the wireless device (e.g., the base station) may operate in a compressed mode and the linearity may be corrected by applying digital pre-distortion.

The diagram 406 illustrates the ET power supply mode. Operations in the ET mode may save more power than each of the direct battery mode, the APT mode, or the EPT mode. The ET mode may use the envelope of the signal to be amplified to control the supply voltage 438 to the PA 430 (e.g., $V_{CC}$). In particular, the signal to be amplified may be fed into an ET detroughing unit 432, which may prevent $V_{CC}$ from dropping down to zero volts. Therefore, a minimum supply voltage may be ensured at the PA 430. The output of the ET detroughing unit 432 may be fed into the ET unit 434, which may generate the supply voltage 438 to the PA 430 based on ET. The bias 438 to the PA 430 may closely, continuously, and instantaneously track the envelope of the signal to be amplified. However, the ET mode may be associated with limitations. The ET mode may operate with no or little loss of linearity when the signal to be amplified is associated with a small bandwidth (e.g., the bandwidth of the signal is below a threshold). On the other hand, due to the limited ability of the presently available ET circuitry to follow the fast changing envelope with higher frequency components, the ET mode may operate with a significant distortion or loss of linearity in the amplified signals when used directly with large bandwidth signals (e.g., the signals used in NR).

To apply the ET power supply mode to the amplification of large bandwidth signals (e.g., wideband signals), limited bandwidth ET techniques may be utilized. In particular, the envelope of a wideband signal may be approximated with a limited bandwidth envelope, and the limited bandwidth envelope may be used as a basis for the PA supply voltage 438 based on ET techniques. The limited bandwidth ET techniques may be associated with a certain amount of residual distortion or non-linearity in the amplified signals. Such residual distortion may be compensated for at the receiver side using digital post-distortion (DPoD) techniques.

Figure 5A:
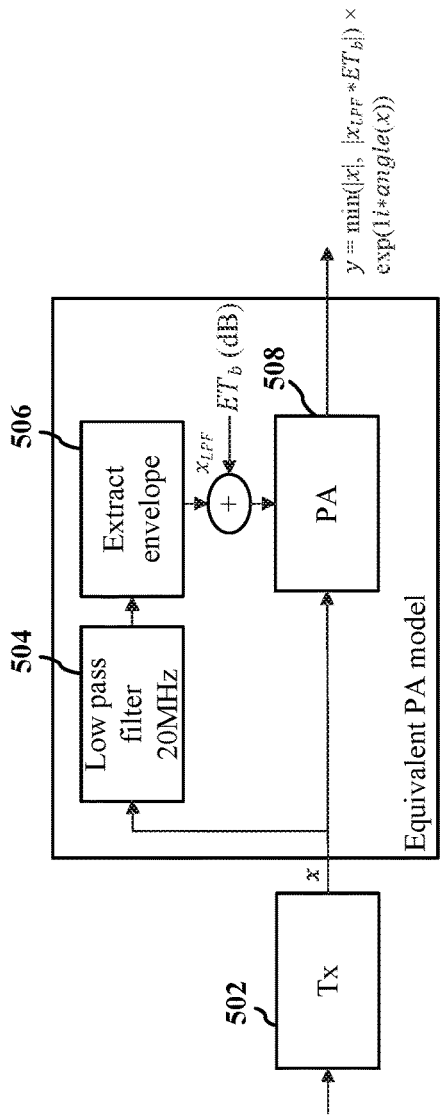
FIGS. 5A and 5B are block diagrams illustrating example PA models based on limited bandwidth ET techniques.
Figure 5B:
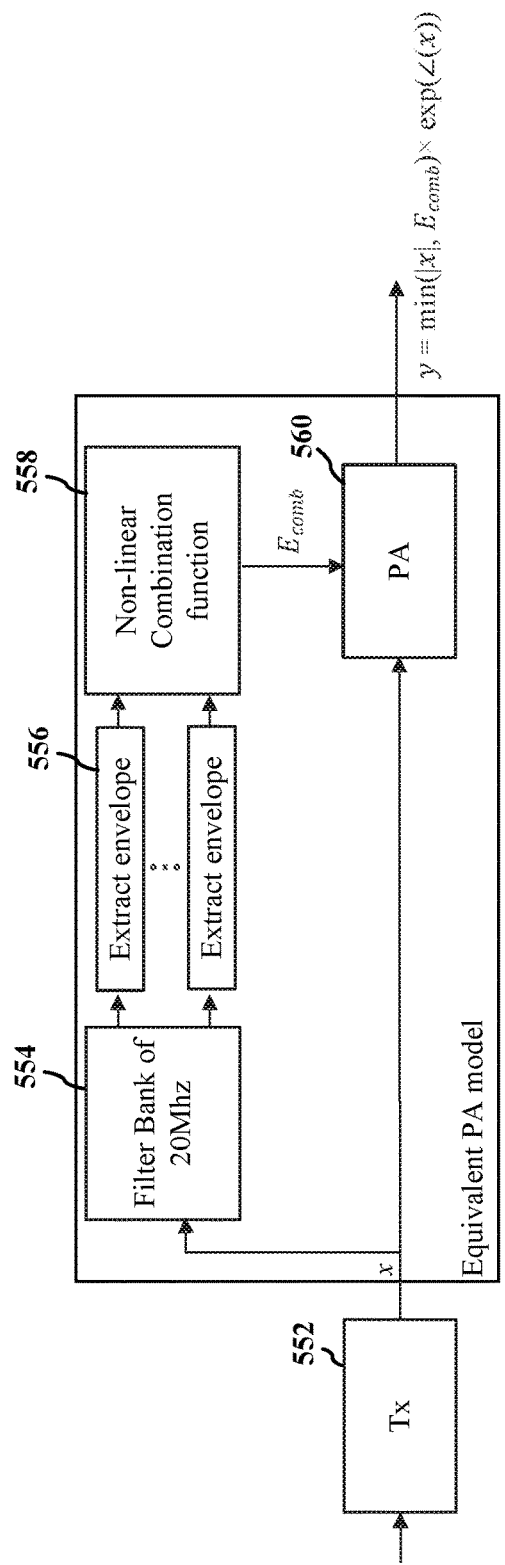

FIGS. 5A and 5B are block diagrams 500A and 500B illustrating example PA models based on limited bandwidth ET techniques. The approximated limited bandwidth envelope may be obtained using various filtering approaches. FIG. 5A illustrates an example PA model using filtered ET. The pre-amplification signal x from the previous stage of the TX chain 502 may be fed into a low pass filter (LPF) 504 (e.g., with a cutoff frequency of 20 MHz). An ET circuitry 506 may extract the limited bandwidth envelope from the signal outputted from the LPF 504. The limited bandwidth envelope output from the ET circuitry 506, $x_{LPF}$, may be combined with an ET back-off value, $ET_b$. The combined output may be used as a basis for the PA 508 supply voltage based on ET techniques. The output of the PA 508, y, may be given by $y=\min(|x|, |x_{LPF}*ET_b|) \times \exp(1i*angle(x))$.

FIG. 5B illustrates an example PA model using filter bank-based ET. The pre-amplification signal x from the previous stage of the TX chain 552 may be fed into a filter bank 554. The filter bank 554 may include a number of filters each of which may output a limited bandwidth signal (e.g., the bandwidth may be approximately 20 MHz) with a different center frequency. A separate ET circuitry 556 may extract a limited bandwidth envelope from the signal outputted by each of the filters in the filter bank 554. Therefore, a number of limited bandwidth envelopes with different center frequencies may be generated by the ET circuitries 556. The limited bandwidth envelopes may be combined at a non-linear combination function 558. The combined output, $E_{comb}$, may be used as a basis for the PA 560 supply voltage based on ET techniques. The output of the PA 560, y, may be given by $y=\min(|x|, E_{comb}) \times \exp(angle(x))$. The PA model illustrated in FIG. 5B may be associated with less distortion/non-linearity than the PA model illustrated in FIG. 5A. For either model, the residual distortion may be compensated for with DPoD techniques at the receiver side.

As described above, the use of the limited bandwidth ET on the TX side may result in distortion. The distortion may increase as the ET becomes more band-limited. The distortion may be corrected using DPoD techniques on the RX side. The DPoD techniques may be based on modeling the non-linearity impairment as an additive signal. In other words, the non-linearity may be estimated, and may be subtracted from the received signal (e.g., through an iterative process) at the RX side based on a non-linearity model. Therefore, to accomplish DPoD, if the source of the non-linearity is limited to the PA, a PA non-linearity model may be estimated, and may be used in connection with the DPoD techniques to obtain the corrected signal at the RX side.

Typically, the PA non-linearity model may be described as a function of the PA input x, i.e., $y=PA(x)$, and may be estimated on the RX side based on one or more dedicated RSs (e.g., pilots) sent from the TX side. However, when the ET process is also a contributor to the non-linearity, the non-linearity model may be different as the non-linearity model may be a function of the reduced bandwidth envelope $E_{nb}$ in addition to being a function of the PA input x, namely: y=PA(x, $E_{nb}$). The specific form of the reduced bandwidth envelope $E_{nb}$ may affect the amount of distortion produced by the PA.

In order to estimate the combined PA and ET non-linearity model, suitable pilots may be designed. The design of the pilots may take into account the bandwidth limitations of the ET circuitry and the non-linearity model estimation capability of the receiver. Accordingly, the TX side (e.g., a base station) may transmit dedicated signaling messages and/or pilots to the RX side (e.g., a UE). The RX side may estimate the combined PA and ET non-linearity model based on the received signaling messages and/or pilots.

Figure 6:
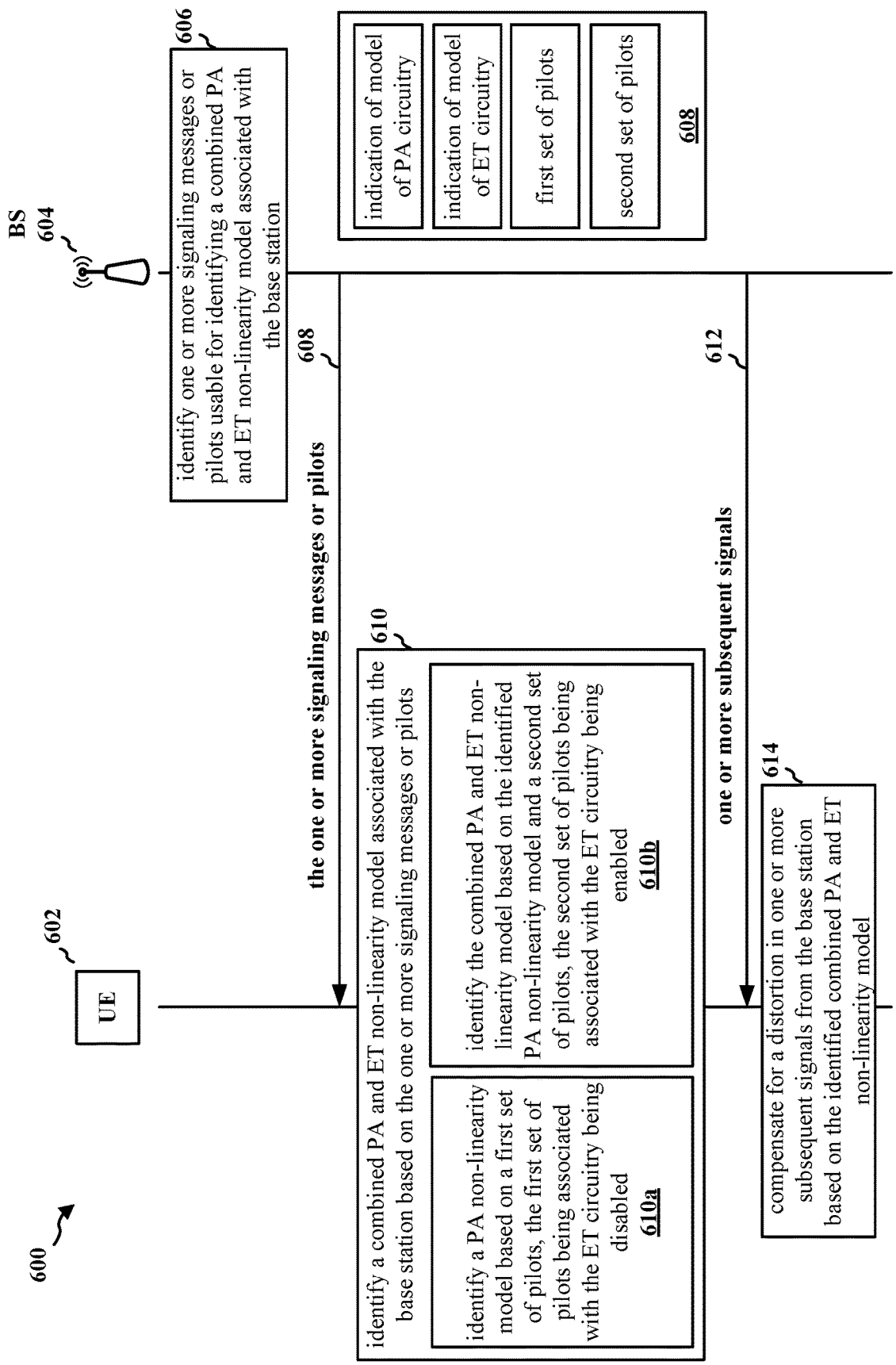
FIG. 6 is a diagram of a communication flow of a method of wireless communication.

FIG. 6 is a diagram of a communication flow 600 of a method of wireless communication. At 606, a base station 604 may identify one or more signaling messages or pilots usable for identifying a combined PA and ET non-linearity model associated with the base station 604. The combined PA and ET non-linearity model may be associated with a PA circuitry and an ET circuitry. The PA circuitry and the ET circuitry may be associated with the base station 604.

At 608, the base station 604 may transmit, to a UE 602, and the UE 602 may receive, from the base station 604, the one or more signaling messages or pilots.

In one configuration, the one or more signaling messages or pilots 608 may include signaling messages indicating a parametrized model of the PA circuitry and a parametrized model of the ET circuitry. In particular, the model of the PA circuitry may include or be in the form of, e.g., a lookup table (LUT) or a list of Volterra kernels (e.g., coefficients of Volterra kernels). The model of the ET circuitry may include, e.g., a filter response model of the ET circuitry. The filter response model may include a filter order. In case an LPF is used in the limited bandwidth ET circuitry, the filter response model may correspond to an LPF response model, and may further include, e.g., filter coefficients (e.g., finite impulse response (FIR) filter coefficients, infinite impulse response (IIR) filter coefficients, etc.), or filter characteristics such as the cutoff frequency. In case a filter bank is used in the limited bandwidth ET circuitry, the filter response model may include, e.g., the number of filters in the filter bank, the width of each filter in the filter bank, the passband frequencies of each filter in the filter bank, etc. Further, in case a filter bank is used in the limited bandwidth ET circuitry, the model of the ET circuitry may include the non-linear combination function. In one configuration, the UE 602 may estimate the parameters of the combined PA and ET non-linearity model based on the signaling messages using a non-linear optimization procedure.

In one configuration, the one or more signaling messages or pilots 608 may include signaling messages indicating some but not all of the parameters of the model of the PA circuitry and/or some but not all of the parameters of the model of the ET circuitry. In particular, the parameters of the model of the PA circuitry may include a lookup table (LUT) or a list of Volterra kernels (e.g., coefficients of Volterra kernels). The parameters of the model of the ET circuitry may include e.g., filter coefficients. In one configuration, the base station 604 may transmit, to the UE 602, an indication of the characteristics of the TX processing used at the base station 604 to limit distortion. The characteristics of the TX processing may include, e.g., the filter bank characteristics and/or the non-linear combination characteristics associated with the non-linear combination function. The characteristics of the TX processing may be directly signaled by the base station 604 via the signaling messages since these characteristics may correspond to dedicated control elements utilized on the TX side.

In one configuration, the one or more signaling messages or pilots 608 may include pilots divided into two stages. At the first stage, the base station 604 may transmit a first set of pilots to the UE 602 with the ET circuitry disabled to enable the UE 602 to estimate the PA non-linearity model based on the first set of pilots. At the second stage, the base station 604 may transmit a second set of pilots to the UE 602 with the ET circuitry enabled to enable the UE 602 to estimate the ET non-linearity model or parameters based on the second set of pilots and the estimated PA non-linearity model from the first stage. In one configuration, the one or more signaling messages or pilots 608 may include pilots that may allow the UE 602 to estimate the combined PA and ET non-linearity model based on a single stage procedure and an iterative process. In particular, instead of the two-stage process, the iterative process may be performed as follows. First, a generic non-linearity model behavior of the ET may be assumed. Based on the assumed ET non-linearity model, a PA non-linearity model may be estimated. Then, based on the estimated PA non-linearity model, the assumed ET non-linearity model may be refined. Further, based on the refined ET non-linearity model, the PA non-linearity model may be refined. Therefore, based on refinement of one non-linearity model, the other non-linearity model may be further refined, and so on. The iterative mutual refinement of the two non-linearity models may be performed for a preconfigured number of iterations, or until convergence (e.g., subsequent iterations may not yield further changes to the two non-linearity models).

At 610, the UE 602 may identify (e.g., estimate or determine) the combined PA and ET non-linearity model associated with the base station 604 based on the one or more signaling messages or pilots 608.

In one configuration where the two-stage estimation of the combined PA and ET non-linearity model is used, at 610a, the UE 602 may identify a PA non-linearity model based on a first set of pilots of the one or more signaling messages or pilots 608. The first set of pilots may be associated with the ET circuitry being disabled.

At 610b, the UE 602 may identify the combined PA and ET non-linearity model based on the identified PA non-linearity model and a second set of pilots of the one or more signaling messages or pilots 608. The second set of pilots may be associated with the ET circuitry being enabled.

At 612, the base station 604 may transmit, to the UE 602, one or more subsequent signals. At 614, the UE 602 may compensate for a distortion in one or more subsequent signals 612 from the base station 604 based on the identified combined PA and ET non-linearity model. To compensate for the distortion, the UE 602 may perform a DPoD process associated with the one or more subsequent signals 612 from the base station 604 based on the identified combined PA and ET non-linearity model.

In one configuration, the base station 604 may transmit pilots associated with various bandwidths to enable the UE 602 to estimate the ET characteristics associated with the ET circuitry of the base station 604.

In one configuration, the base station 604 may transmit pilots associated with various power levels to enable the UE 602 to estimate $V_{dd,min}$, that is, the envelope value at or below which ET may not be used as the power consumption is sufficiently low such that the use of ET may not be warranted. In other words, $V_{dd,min}$ may be a threshold envelope value associated with the ET circuitry being enabled or disabled, where the ET circuitry may be enabled when the envelope value is greater than $V_{dd,min}$, and may be disabled when the envelope value is less than $V_{dd,min}$.

In one configuration, in order to achieve high quality wideband channel estimation at the UE 602, the base station 604 may transmit, to the UE 602, multiple narrowband pilots (e.g., pilots whose bandwidths are less than a threshold) to avoid the distortion induced by the limited bandwidth ET process. Accordingly, the UE 602 may perform channel estimation based on the narrowband pilots.

Figure 7:
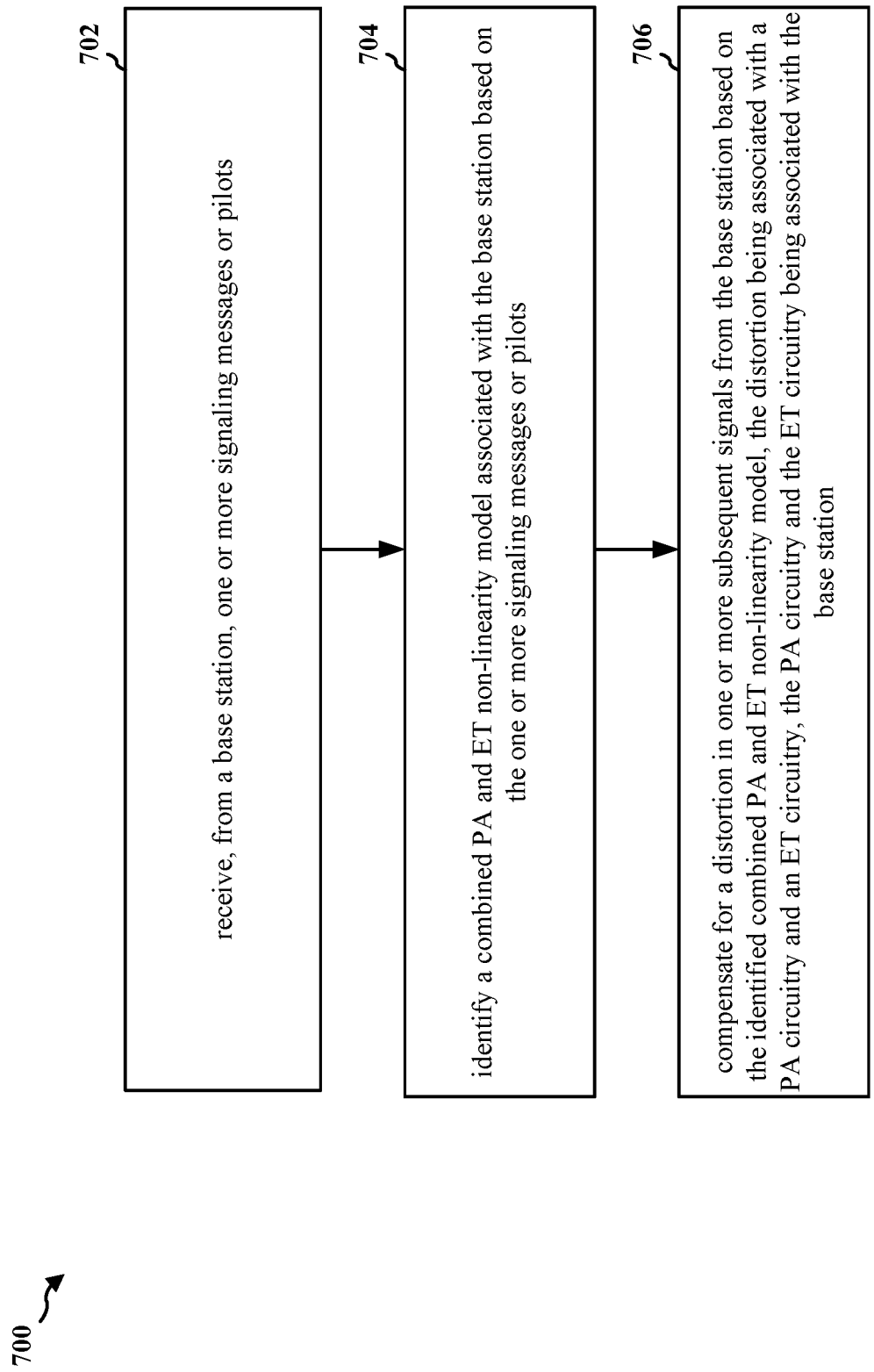
FIG. 7 is a flowchart of a method of wireless communication.

FIG. 7 is a flowchart 700 of a method of wireless communication. The method may be performed by a UE (e.g., the UE 104/350/602; the apparatus 1102). At 702, the UE may receive, from a base station, one or more signaling messages or pilots. For example, 702 may be performed by the non-linearity estimation component 1140 in FIG. 11. Referring to FIG. 6, at 608, the UE 602 may receive, from a base station 604, one or more signaling messages or pilots.

At 704, the UE may identify a combined PA and ET non-linearity model associated with the base station based on the one or more signaling messages or pilots. For example, 704 may be performed by the non-linearity estimation component 1140 in FIG. 11. Referring to FIG. 6, at 610, the UE 602 may identify a combined PA and ET non-linearity model associated with the base station 604 based on the one or more signaling messages or pilots 608.

At 706, the UE may compensate for a distortion in one or more subsequent signals from the base station based on the identified combined PA and ET non-linearity model. The distortion may be associated with a PA circuitry and an ET circuitry. The PA circuitry and the ET circuitry may be associated with the base station. For example, 706 may be performed by the non-linearity estimation component 1140 in FIG. 11. Referring to FIG. 6, at 614, the UE 602 may compensate for a distortion in one or more subsequent signals 612 from the base station 604 based on the identified combined PA and ET non-linearity model.

Figure 8:
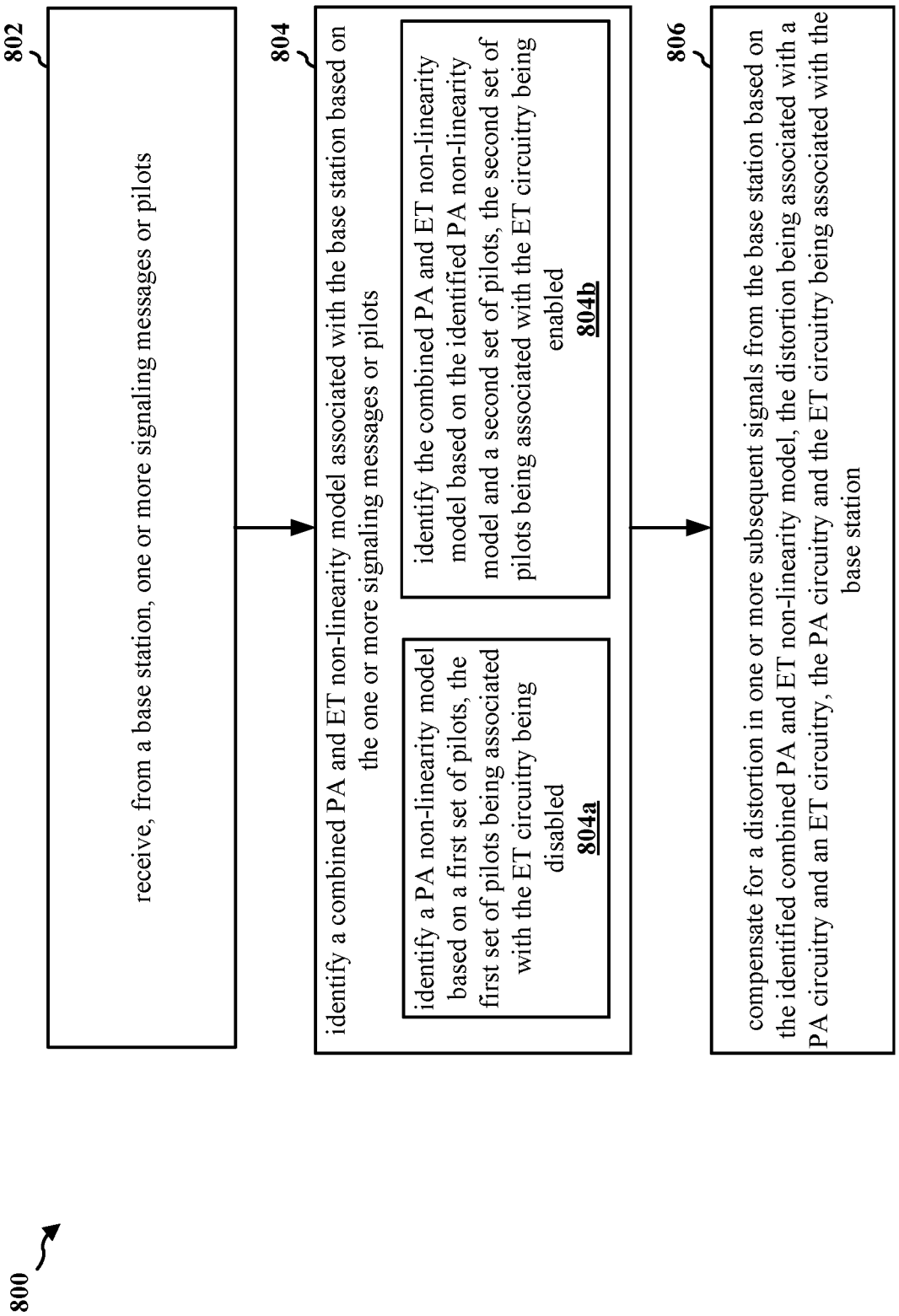
FIG. 8 is a flowchart of a method of wireless communication.

FIG. 8 is a flowchart 800 of a method of wireless communication. The method may be performed by a UE (e.g., the UE 104/350/602; the apparatus 1102). At 802, the UE may receive, from a base station, one or more signaling messages or pilots. For example, 802 may be performed by the non-linearity estimation component 1140 in FIG. 11. Referring to FIG. 6, at 608, the UE 602 may receive, from a base station 604, one or more signaling messages or pilots.

At 804, the UE may identify a combined PA and ET non-linearity model associated with the base station based on the one or more signaling messages or pilots. For example, 804 may be performed by the non-linearity estimation component 1140 in FIG. 11. Referring to FIG. 6, at 610, the UE 602 may identify a combined PA and ET non-linearity model associated with the base station 604 based on the one or more signaling messages or pilots 608.

At 806, the UE may compensate for a distortion in one or more subsequent signals from the base station based on the identified combined PA and ET non-linearity model. The distortion may be associated with a PA circuitry and an ET circuitry. The PA circuitry and the ET circuitry may be associated with the base station. For example, 806 may be performed by the non-linearity estimation component 1140 in FIG. 11. Referring to FIG. 6, at 614, the UE 602 may compensate for a distortion in one or more subsequent signals 612 from the base station 604 based on the identified combined PA and ET non-linearity model.

In one configuration, referring to FIG. 6, the one or more signaling messages or pilots 608 may include an indication of a PA non-linearity model. The PA non-linearity model may be associated with an input signal or an instantaneous power supply voltage.

In one configuration, the PA non-linearity model may correspond to an LUT or one or more Volterra kernels.

In one configuration, referring to FIG. 6, the one or more signaling messages or pilots 608 may include an indication of an ET non-linearity model.

In one configuration, the ET non-linearity model may correspond to a filter response model associated with the ET circuitry associated with the base station.

In one configuration, referring to FIG. 6, the one or more signaling messages or pilots 608 may include an indication of one or more characteristics of TX signal processing associated with the base station.

In one configuration, the combined PA and ET non-linearity model may be identified based on a non-linear optimization procedure.

In one configuration, to identify the combined PA and ET non-linearity model associated with the base station, at 804*a*, the UE may identify a PA non-linearity model based on a first set of pilots of the one or more signaling messages or pilots. The first set of pilots may be associated with the ET circuitry being disabled. For example, 804*a* may be performed by the non-linearity estimation component 1140 in FIG. 11. Referring to FIG. 6, at 610*a*, the UE 602 may identify a PA non-linearity model based on a first set of pilots of the one or more signaling messages or pilots.

At 804*b*, the UE may identify the combined PA and ET non-linearity model based on the identified PA non-linearity model and a second set of pilots of the one or more signaling messages or pilots. The second set of pilots may be associated with the ET circuitry being enabled. For example, 804*b* may be performed by the non-linearity estimation component 1140 in FIG. 11. Referring to FIG. 6, at 610*b*, the UE 602 may identify the combined PA and ET non-linearity model based on the identified PA non-linearity model and a second set of pilots of the one or more signaling messages or pilots.

In one configuration, referring to FIG. 6, the one or more signaling messages or pilots 608 may be associated with a plurality of bandwidths. The UE 602 may estimate one or more ET characteristics associated with the base station 604 based on the one or more signaling messages or pilots 608.

In one configuration, referring to FIG. 6, the one or more signaling messages or pilots 608 may be associated with a plurality of power levels. The UE 602 may estimate a threshold envelope value associated with the ET circuitry being enabled or disabled based on the one or more signaling messages or pilots 608.

In one configuration, referring to FIG. 6, at least some of the one or more signaling messages or pilots 608 may be associated with one or more bandwidths that are less than a threshold.

In one configuration, referring to FIG. 6, to compensate for the distortion, the UE 602 may perform a DPoD process associated with the one or more subsequent signals from the base station 604 based on the identified combined PA and ET non-linearity model.

Figure 9:
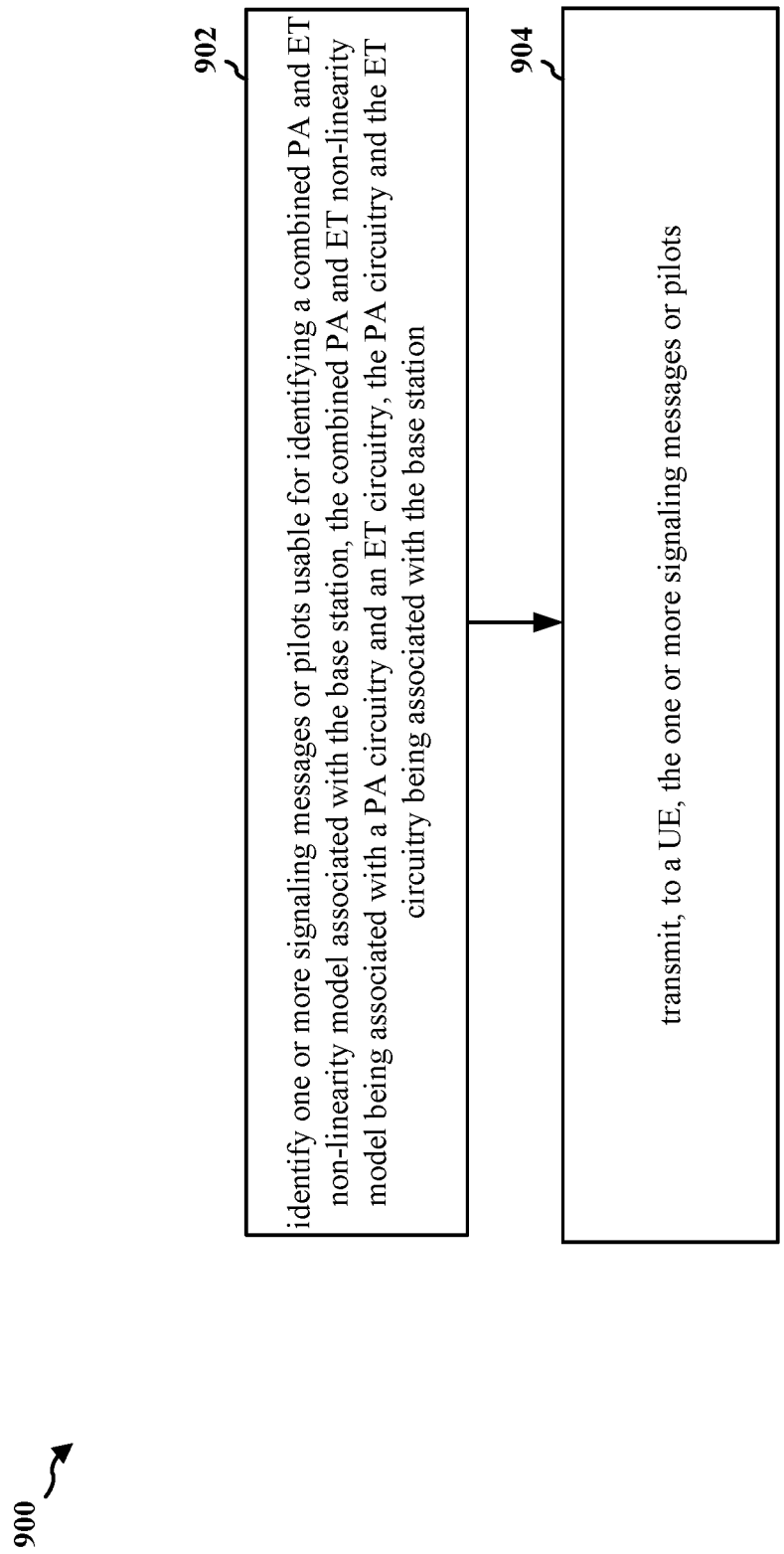
FIG. 9 is a flowchart of a method of wireless communication.

FIG. 9 is a flowchart 900 of a method of wireless communication. The method may be performed by a base station (e.g., the base station 102/180/310/604; the apparatus 1202). At 902, the base station may identify one or more signaling messages or pilots usable for identifying a combined PA and ET non-linearity model associated with the base station. The combined PA and ET non-linearity model may be associated with a PA circuitry and an ET circuitry. The PA circuitry and the ET circuitry may be associated with the base station. For example, 902 may be performed by the non-linearity estimation component 1240 in FIG. 12. Referring to FIG. 6, at 606, the base station 604 may identify one or more signaling messages or pilots usable for identifying a combined PA and ET non-linearity model associated with the base station 604.

At 904, the base station may transmit, to a UE, the one or more signaling messages or pilots. For example, 904 may be performed by the non-linearity estimation component 1240 in FIG. 12. Referring to FIG. 6, at 608, the base station 604 may transmit, to a UE 602, the one or more signaling messages or pilots.

Figure 10:
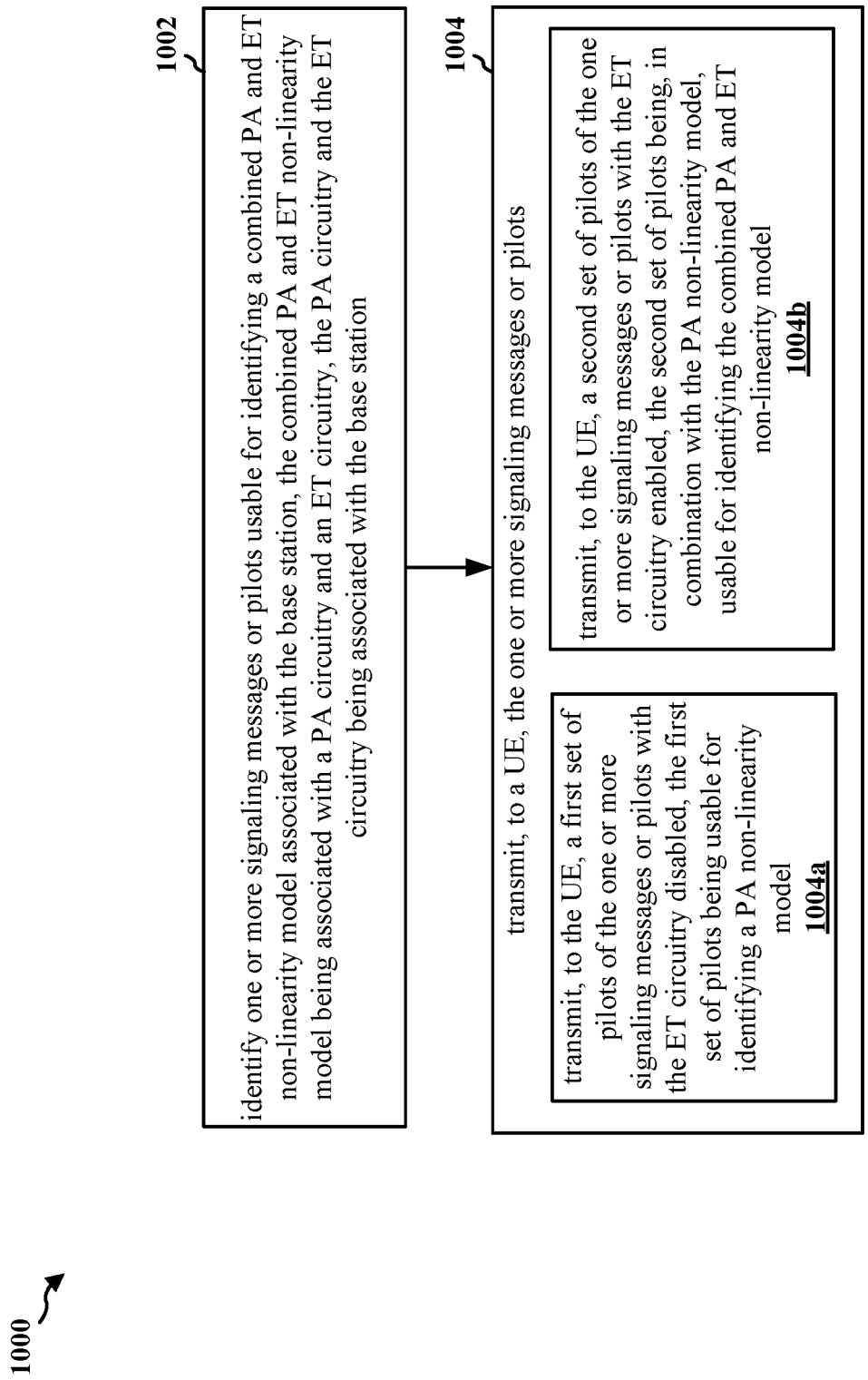
FIG. 10 is a flowchart of a method of wireless communication.

FIG. 10 is a flowchart 1000 of a method of wireless communication. The method may be performed by a base station (e.g., the base station 102/180/310/604; the apparatus 1202). At 1002, the base station may identify one or more signaling messages or pilots usable for identifying a combined PA and ET non-linearity model associated with the base station. The combined PA and ET non-linearity model may be associated with a PA circuitry and an ET circuitry. The PA circuitry and the ET circuitry may be associated with the base station. For example, 1002 may be performed by the non-linearity estimation component 1240 in FIG. 12. Referring to FIG. 6, at 606, the base station 604 may identify one or more signaling messages or pilots usable for identifying a combined PA and ET non-linearity model associated with the base station 604.

At 1004, the base station may transmit, to a UE, the one or more signaling messages or pilots. For example, 1004 may be performed by the non-linearity estimation component 1240 in FIG. 12. Referring to FIG. 6, at 608, the base station 604 may transmit, to a UE 602, the one or more signaling messages or pilots.

In one configuration, referring to FIG. 6, the one or more signaling messages or pilots 608 may include an indication of a PA non-linearity model. The PA non-linearity model may be associated with an input signal or an instantaneous power supply voltage.

In one configuration, the PA non-linearity model may correspond to an LUT or one or more Volterra kernels.

In one configuration, referring to FIG. 6, the one or more signaling messages or pilots 608 may include an indication of an ET non-linearity model.

In one configuration, the ET non-linearity model may correspond to a filter response model associated with the ET circuitry associated with the base station.

In one configuration, referring to FIG. 6, the one or more signaling messages or pilots 608 may include an indication of one or more characteristics of TX signal processing associated with the base station.

In one configuration, at 1004*a*, the base station may transmit, to the UE, a first set of pilots of the one or more signaling messages or pilots with the ET circuitry disabled. The first set of pilots may be usable for identifying a PA non-linearity model. For example, 1004*a* may be performed by the non-linearity estimation component 1240 in FIG. 12. Referring to FIG. 6, at 608, the base station 604 may transmit, to the UE 602, a first set of pilots of the one or more signaling messages or pilots with the ET circuitry disabled.

At 1004*b*, the base station may transmit, to the UE, a second set of pilots of the one or more signaling messages or pilots with the ET circuitry enabled. The second set of pilots may be, in combination with the PA non-linearity model, usable for identifying the combined PA and ET non-linearity model. For example, 1004*b* may be performed by the non-linearity estimation component 1240 in FIG. 12. Referring to FIG. 6, at 608, the base station 604 may transmit, to the UE 602, a second set of pilots of the one or more signaling messages or pilots with the ET circuitry enabled.

In one configuration, referring to FIG. 6, the one or more signaling messages or pilots 608 may be associated with a plurality of bandwidths. The one or more signaling messages or pilots 608 may be usable for estimating one or more ET characteristics associated with the base station.

In one configuration, referring to FIG. 6, the one or more signaling messages or pilots 608 may be associated with a plurality of power levels. The one or more signaling messages or pilots 608 may be usable for estimating a threshold envelope value associated with the ET circuitry being enabled or disabled.

In one configuration, referring to FIG. 6, at least some of the one or more signaling messages or pilots 608 may be associated with one or more bandwidths that are less than a threshold.

Figure 11:
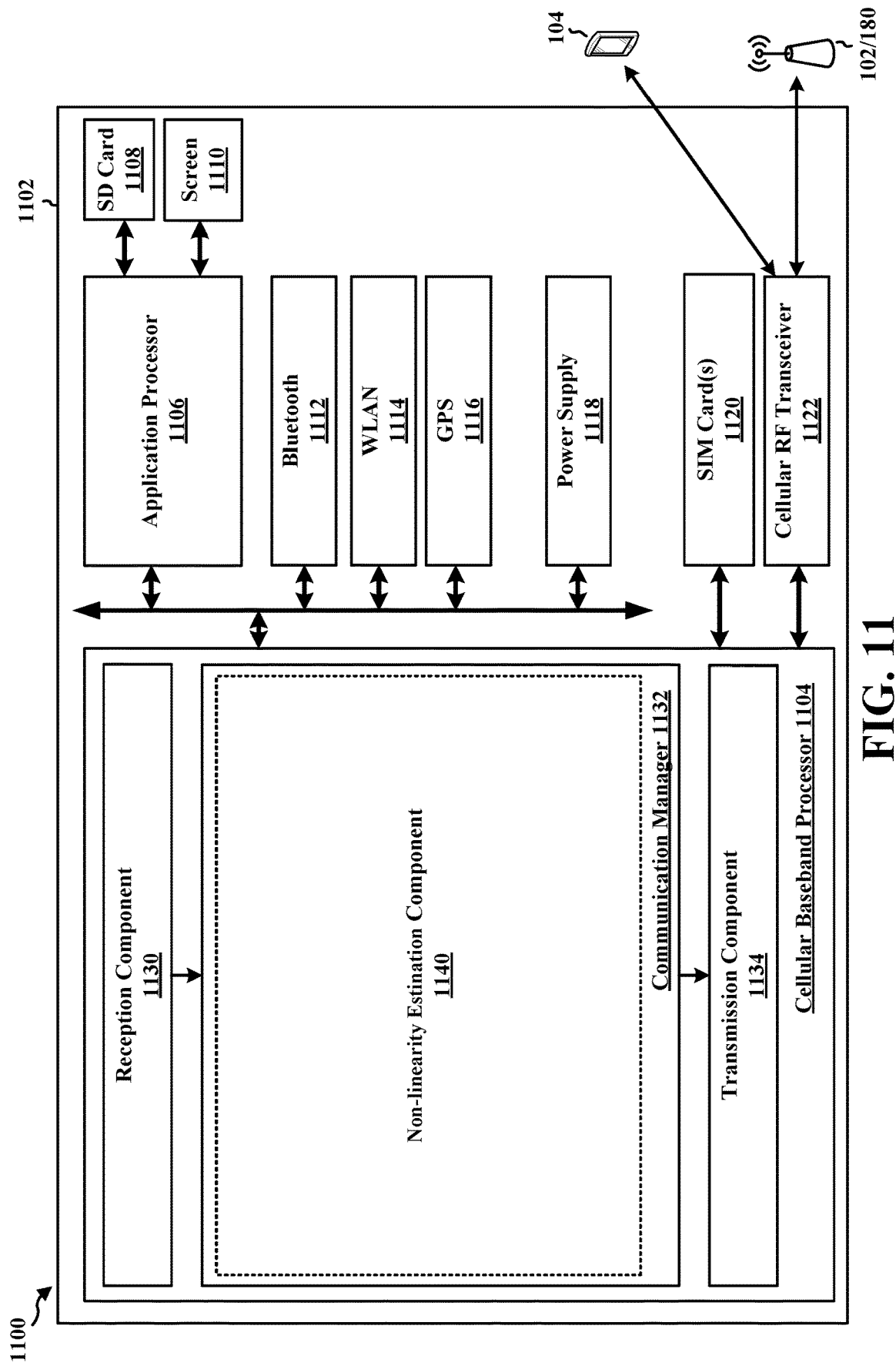
FIG. 11 is a diagram illustrating an example of a hardware implementation for an example apparatus.

FIG. 11 is a diagram 1100 illustrating an example of a hardware implementation for an apparatus 1102. The apparatus 1102 may be a UE, a component of a UE, or may implement UE functionality. In some aspects, the apparatus 1102 may include a cellular baseband processor 1104 (also referred to as a modem) coupled to a cellular RF transceiver 1122. In some aspects, the apparatus 1102 may further include one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, or a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the additional modules of the apparatus 1102.

The communication manager 1132 includes a non-linearity estimation component 1140 that may be configured to receive, from a base station, one or more signaling messages or pilots, e.g., as described in connection with 704 in FIGS.

7 and 802 in FIG. 8. The non-linearity estimation component 1140 may be configured to identify a combined PA and ET non-linearity model associated with the base station based on the one or more signaling messages or pilots, e.g., as described in connection with 704 in FIGS. 7 and 804 in FIG. 8. The non-linearity estimation component 1140 may be configured to identify a PA non-linearity model based on a first set of pilots of the one or more signaling messages or pilots, e.g., as described in connection with 804a in FIG. 8. The non-linearity estimation component 1140 may be configured to identify the combined PA and ET non-linearity model based on the identified PA non-linearity model and a second set of pilots of the one or more signaling messages or pilots, e.g., as described in connection with 804b in FIG. 8. The non-linearity estimation component 1140 may be configured to compensate for a distortion in one or more subsequent signals from the base station based on the identified combined PA and ET non-linearity model, e.g., as described in connection with 706 in FIGS. 7 and 806 in FIG. 8.

The apparatus may include additional components that perform each of the blocks of the algorithm in the flowcharts of FIGS. 6-8. As such, each block in the flowcharts of FIGS. 6-8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the cellular baseband processor 1104, includes means for receiving, from a base station, one or more signaling messages or pilots. The apparatus 1102, and in particular the cellular baseband processor 1104, includes means for identifying a combined PA and ET non-linearity model associated with the base station based on the one or more signaling messages or pilots. The apparatus 1102, and in particular the cellular baseband processor 1104, includes means for compensating for a distortion in one or more subsequent signals from the base station based on the identified combined PA and ET non-linearity model. The distortion may be associated with a PA circuitry and an ET circuitry. The PA circuitry and the ET circuitry may be associated with the base station.

In one configuration, the one or more signaling messages or pilots may include an indication of a PA non-linearity model. The PA non-linearity model may be associated with an input signal or an instantaneous power supply voltage. In one configuration, the PA non-linearity model may correspond to an LUT or one or more Volterra kernels. In one configuration, the one or more signaling messages or pilots may include an indication of an ET non-linearity model. In one configuration, the ET non-linearity model may correspond to a filter response model associated with the ET circuitry associated with the base station. In one configuration, the one or more signaling messages or pilots may include an indication of one or more characteristics of TX signal processing associated with the base station. In one configuration, the combined PA and ET non-linearity model may be identified based on a non-linear optimization procedure. In one configuration, the means for identifying the combined PA and ET non-linearity model associated with the base station may be further configured to identify a PA non-linearity model based on a first set of pilots of the one or more signaling messages or pilots. The means for identifying the combined PA and ET non-linearity model associated with the base station may be further configured to identifying the combined PA and ET non-linearity model based on the identified PA non-linearity model and a second set of pilots of the one or more signaling messages or pilots. In one configuration, the one or more signaling messages or pilots may be associated with a plurality of bandwidths. The apparatus 1102, and in particular the cellular baseband processor 1104, includes means for estimating one or more ET characteristics associated with the base station based on the one or more signaling messages or pilots. In one configuration, the one or more signaling messages or pilots may be associated with a plurality of power levels. The apparatus 1102, and in particular the cellular baseband processor 1104, includes means for estimating a threshold envelope value associated with the ET circuitry being enabled or disabled based on the one or more signaling messages or pilots. In one configuration, at least some of the one or more signaling messages or pilots may be associated with one or more bandwidths that are less than a threshold. In one configuration, the means for compensating for the distortion may be further configured to perform a DPoD process associated with the one or more subsequent signals from the base station based on the identified combined PA and ET non-linearity model.

The means may be one or more of the components of the apparatus 1102 configured to perform the functions recited by the means. As described supra, the apparatus 1102 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 12:
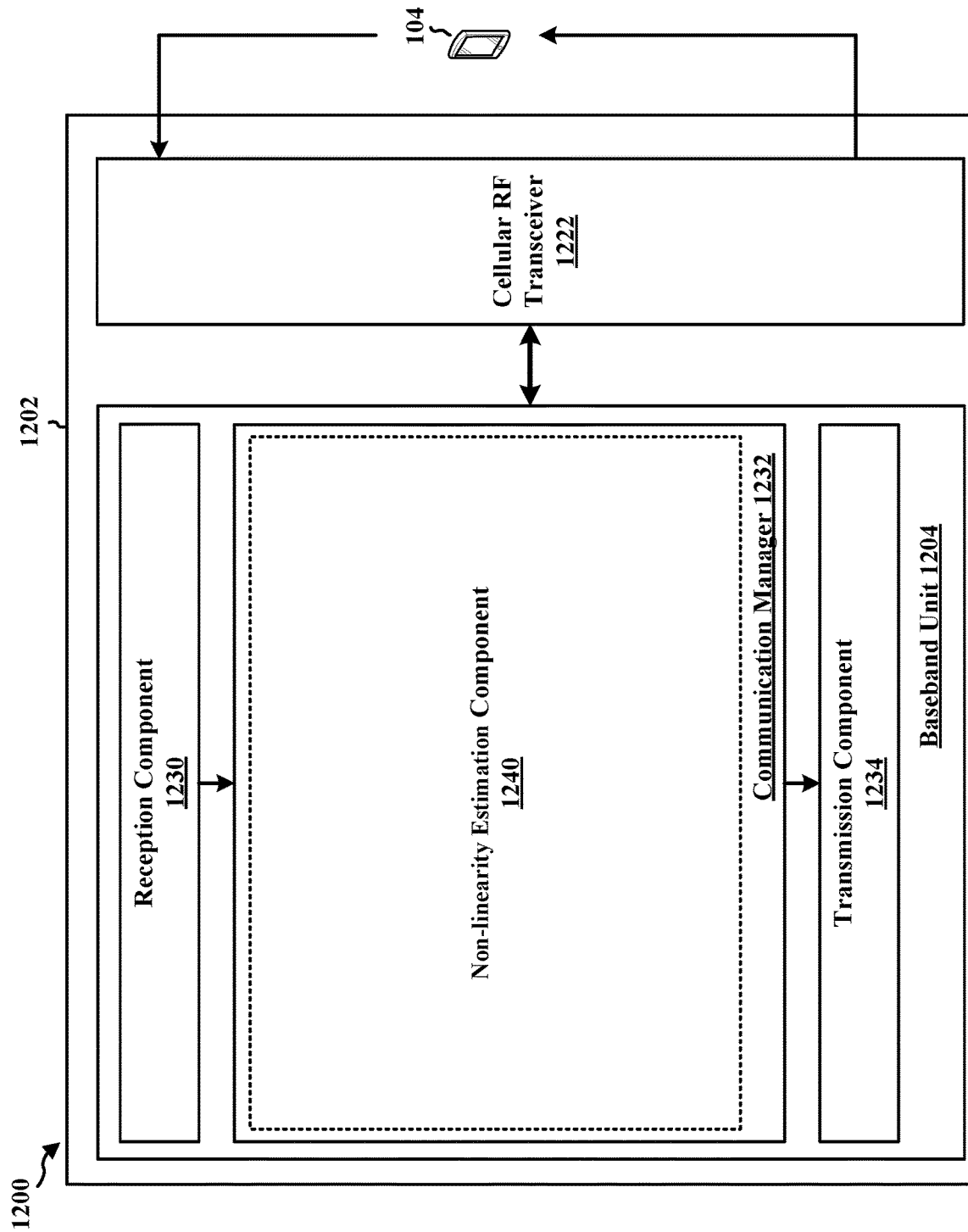
FIG. 12 is a diagram illustrating an example of a hardware implementation for an example apparatus.

FIG. 12 is a diagram 1200 illustrating an example of a hardware implementation for an apparatus 1202. The apparatus 1202 may be a base station, a component of a base station, or may implement base station functionality. In some aspects, the apparatus 1202 may include a baseband unit 1204. The baseband unit 1204 may communicate through a cellular RF transceiver 1222 with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the base station 310 and may include the memory 376 and/or at least one of the TX processor 316, the RX processor 370, and the controller/processor 375.

The communication manager 1232 includes a non-linearity estimation component 1240 that may be configured to identify one or more signaling messages or pilots usable for identifying a combined PA and ET non-linearity model associated with the base station, e.g., as described in connection with 902 in FIGS. 9 and 1002 in FIG. 10. The non-linearity estimation component 1240 may be configured to transmit, to a UE, the one or more signaling messages or pilots, e.g., as described in connection with 904 in FIGS. 9 and 1004 in FIG. 10. The non-linearity estimation component 1240 may be configured to transmit, to the UE, a first set of pilots of the one or more signaling messages or pilots with the ET circuitry disabled, e.g., as described in connection with 1004a in FIG. 10. The non-linearity estimation component 1240 may be configured to transmit, to the UE, a second set of pilots of the one or more signaling messages or pilots with the ET circuitry enabled, e.g., as described in connection with 1004b in FIG. 10.

The apparatus may include additional components that perform each of the blocks of the algorithm in the flowcharts of FIGS. 6, 9, and 10. As such, each block in the flowcharts of FIGS. 6, 9, and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the baseband unit 1204, includes means for identifying one or more signaling messages or pilots usable for identifying a combined PA and ET non-linearity model associated with the base station. The combined PA and ET non-linearity model may be associated with a PA circuitry and an ET circuitry. The PA circuitry and the ET circuitry may be associated with the base station. The apparatus 1202, and in particular the baseband unit 1204, includes means for transmitting, to a UE, the one or more signaling messages or pilots.

In one configuration, the one or more signaling messages or pilots may include an indication of a PA non-linearity model. The PA non-linearity model may be associated with an input signal or an instantaneous power supply voltage. In one configuration, the PA non-linearity model may correspond to an LUT or one or more Volterra kernels. In one configuration, the one or more signaling messages or pilots may include an indication of an ET non-linearity model. In one configuration, the ET non-linearity model may correspond to a filter response model associated with the ET circuitry associated with the base station. In one configuration, the one or more signaling messages or pilots may include an indication of one or more characteristics of TX signal processing associated with the base station. In one configuration, the apparatus 1202, and in particular the baseband unit 1204, includes means for transmitting, to the UE, a first set of pilots of the one or more signaling messages or pilots with the ET circuitry disabled. The first set of pilots may be usable for identifying a PA non-linearity model. The apparatus 1202, and in particular the baseband unit 1204, includes means for transmitting, to the UE, a second set of pilots of the one or more signaling messages or pilots with the ET circuitry enabled. In one configuration, the one or more signaling messages or pilots may be associated with a plurality of bandwidths. The one or more signaling messages or pilots may be usable for estimating one or more ET characteristics associated with the base station. In one configuration, the one or more signaling messages or pilots may be associated with a plurality of power levels. The one or more signaling messages or pilots may be usable for estimating a threshold envelope value associated with the ET circuitry being enabled or disabled. In one configuration, at least some of the one or more signaling messages or pilots may be associated with one or more bandwidths that are less than a threshold.

The means may be one or more of the components of the apparatus 1202 configured to perform the functions recited by the means. As described supra, the apparatus 1202 may include the TX Processor 316, the RX Processor 370, and the controller/processor 375. As such, in one configuration, the means may be the TX Processor 316, the RX Processor 370, and the controller/processor 375 configured to perform the functions recited by the means.

Referring back to FIG. 5A-12, a base station may identify one or more signaling messages or pilots usable for identifying a combined PA and ET non-linearity model associated with the base station. The combined PA and ET non-linearity model may be associated with a PA circuitry and an ET circuitry. The PA circuitry and the ET circuitry may be associated with the base station. The base station may transmit, to the UE, and the UE may receive, from the base station, the one or more signaling messages or pilots. The UE may identify a combined PA and ET non-linearity model associated with the base station based on the one or more signaling messages or pilots. The UE may compensate for a distortion in one or more subsequent signals from the base station based on the identified combined PA and ET non-linearity model. The distortion may be associated with a PA circuitry and an ET circuitry. Accordingly, the ET power supply mode may be used at the PA of the base station even when wideband signals, such as the signals for NR, are to be amplified. Based on the combined PA and ET non-linearity model, any residual distortion may be removed at the UE based on DPoD techniques.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to receive, from a base station, one or more signaling messages or pilots; identify a combined PA and ET non-linearity model associated with the base station based on the one or more signaling messages or pilots; and compensate for a distortion in one or more subsequent signals from the base station based on the identified combined PA and ET non-linearity model, the distortion being associated with a PA circuitry and an ET circuitry, the PA circuitry and the ET circuitry being associated with the base station.

Aspect 2 is the apparatus of aspect 1, where the one or more signaling messages or pilots include an indication of a PA non-linearity model, and the PA non-linearity model is associated with an input signal or an instantaneous power supply voltage.

Aspect 3 is the apparatus of aspect 2, where the PA non-linearity model corresponds to an LUT or one or more Volterra kernels.

Aspect 4 is the apparatus of any of aspects 1 to 3, where the one or more signaling messages or pilots include an indication of an ET non-linearity model.

Aspect 5 is the apparatus of aspect 4, where the ET non-linearity model corresponds to a filter response model associated with the ET circuitry associated with the base station.

Aspect 6 is the apparatus of any of aspects 1 to 5, where the one or more signaling messages or pilots include an indication of one or more characteristics of TX signal processing associated with the base station.

Aspect 7 is the apparatus of any of aspects 1 to 6, where the combined PA and ET non-linearity model is identified based on a non-linear optimization procedure.

Aspect 8 is the apparatus of any of aspects 1 to 7, where to identify the combined PA and ET non-linearity model associated with the base station, the at least one processor is further configured to: identify a PA non-linearity model based on a first set of pilots of the one or more signaling messages or pilots, the first set of pilots being associated with the ET circuitry being disabled; and identify the combined PA and ET non-linearity model based on the identified PA non-linearity model and a second set of pilots of the one or more signaling messages or pilots, the second set of pilots being associated with the ET circuitry being enabled.

Aspect 9 is the apparatus of any of aspects 1 to 8, where the one or more signaling messages or pilots are associated with a plurality of bandwidths, and the at least one processor is further configured to estimate one or more ET characteristics associated with the base station based on the one or more signaling messages or pilots.

Aspect 10 is the apparatus of any of aspects 1 to 9, where the one or more signaling messages or pilots are associated with a plurality of power levels, and the at least one processor is further configured to estimate a threshold envelope value associated with the ET circuitry being enabled or disabled based on the one or more signaling messages or pilots.

Aspect 11 is the apparatus of any of aspects 1 to 10, where at least some of the one or more signaling messages or pilots are associated with one or more bandwidths that are less than a threshold.

Aspect 12 is the apparatus of any of aspects 1 to 11, where to compensate for the distortion, the at least one processor is further configured to perform a DPoD process associated with the one or more subsequent signals from the base station based on the identified combined PA and ET non-linearity model.

Aspect 13 is the apparatus of any of aspects 1 to 12, further including a transceiver coupled to the at least one processor.

Aspect 14 is an apparatus for wireless communication at a base station including at least one processor coupled to a memory and configured to identify one or more signaling messages or pilots usable for identifying a combined PA and ET non-linearity model associated with the base station, the combined PA and ET non-linearity model being associated with a PA circuitry and an ET circuitry, the PA circuitry and the ET circuitry being associated with the base station; and transmit, to a UE, the one or more signaling messages or pilots.

Aspect 15 is the apparatus of aspect 14, where the one or more signaling messages or pilots include an indication of a PA non-linearity model, and the PA non-linearity model is associated with an input signal or an instantaneous power supply voltage.

Aspect 16 is the apparatus of aspect 15, where the PA non-linearity model corresponds to an LUT or one or more Volterra kernels.

Aspect 17 is the apparatus of any of aspects 14 to 16, where the one or more signaling messages or pilots include an indication of an ET non-linearity model.

Aspect 18 is the apparatus of aspect 17, where the ET non-linearity model corresponds to a filter response model associated with the ET circuitry associated with the base station.

Aspect 19 is the apparatus of any of aspects 14 to 18, where the one or more signaling messages or pilots include an indication of one or more characteristics of TX signal processing associated with the base station.

Aspect 20 is the apparatus of any of aspects 14 to 19, the at least one processor being further configured to: transmit, to the UE, a first set of pilots of the one or more signaling messages or pilots with the ET circuitry disabled, the first set of pilots being usable for identifying a PA non-linearity model; and transmit, to the UE, a second set of pilots of the one or more signaling messages or pilots with the ET circuitry enabled, the second set of pilots being, in combination with the PA non-linearity model, usable for identifying the combined PA and ET non-linearity model.

Aspect 21 is the apparatus of any of aspects 14 to 20, where the one or more signaling messages or pilots are associated with a plurality of bandwidths, and the one or more signaling messages or pilots are usable for estimating one or more ET characteristics associated with the base station based on the one or more signaling messages or pilots.

Aspect 22 is the apparatus of any of aspects 14 to 21, where the one or more signaling messages or pilots are associated with a plurality of power levels, and the one or more signaling messages or pilots are usable for estimating a threshold envelope value associated with the ET circuitry being enabled or disabled based on the one or more signaling messages or pilots.

Aspect 23 is the apparatus of any of aspects 14 to 22, where at least some of the one or more signaling messages or pilots are associated with one or more bandwidths that are less than a threshold.

Aspect 24 is the apparatus of any of aspects 14 to 23, further including a transceiver coupled to the at least one processor.

Aspect 25 is a method of wireless communication for implementing any of aspects 1 to 24.

Aspect 26 is an apparatus for wireless communication including means for implementing any of aspects 1 to 24.

Aspect 27 is a computer-readable medium storing computer executable code, where the code when executed by a processor causes the processor to implement any of aspects 1 to 24.

What is claimed is:

1. An apparatus for wireless communication at a user equipment (UE), comprising:
   memory; and
   at least one processor coupled to the memory and configured to:
   receive, from a base station, one or more signaling messages or pilots;
   identify a combined power amplifier (PA) and envelope tracking (ET) non-linearity model associated with the base station based on the one or more signaling messages or pilots; and
   compensate for a distortion in one or more subsequent signals from the base station based on the identified combined PA and ET non-linearity model, the distortion being associated with a PA circuitry and an ET circuitry, the PA circuitry and the ET circuitry being associated with the base station, and wherein at least one of:
   the one or more signaling messages or pilots include an indication of an ET non-linearity model, and wherein the ET non-linearity model corresponds to a filter response model associated with the ET circuitry associated with the base station;
   the one or more signaling messages or pilots are associated with a plurality of power levels, and the at least one processor is further configured to estimate a threshold envelope value associated with the ET circuitry being enabled or disabled based on the one or more signaling messages or pilots;
   at least some of the one or more signaling messages or pilots are associated with one or more bandwidths that are less than a threshold; or
   to compensate for the distortion, the at least one processor is further configured to perform a digital post-distortion (DPoD) process associated with the one or more subsequent signals from the base station based on the identified combined PA and ET non-linearity model.

2. The apparatus of claim 1, wherein the one or more signaling messages or pilots include an indication of a PA non-linearity model, and the PA non-linearity model is associated with an input signal or an instantaneous power supply voltage.

3. The apparatus of claim 2, wherein the PA non-linearity model corresponds to a lookup table (LUT) or one or more Volterra kernels.

4. The apparatus of claim 1, wherein the ET non-linearity model corresponds to the filter response model associated with the ET circuitry associated with the base station.

5. The apparatus of claim 1, wherein the one or more signaling messages or pilots include an indication of one or more characteristics of transmit (TX) signal processing associated with the base station.

6. The apparatus of claim 1, wherein to identify the combined PA and ET non-linearity model, the at least one processor is configured to identify the combined PA and ET non-linearity model based on a non-linear optimization procedure.

7. The apparatus of claim 1, wherein to identify the combined PA and ET non-linearity model associated with the base station, the at least one processor is further configured to:
   identify a PA non-linearity model based on a first set of pilots of the one or more signaling messages or pilots, the first set of pilots being associated with the ET circuitry being disabled; and
   identify the combined PA and ET non-linearity model based on the identified PA non-linearity model and a second set of pilots of the one or more signaling messages or pilots, the second set of pilots being associated with the ET circuitry being enabled.

8. The apparatus of claim 1, wherein the one or more signaling messages or pilots are associated with a plurality of bandwidths, and the at least one processor is further configured to estimate one or more ET characteristics associated with the base station based on the one or more signaling messages or pilots.

9. The apparatus of claim 1, wherein the one or more signaling messages or pilots are associated with the plurality of power levels, and the at least one processor is further configured to estimate the threshold envelope value associated with the ET circuitry being enabled or disabled based on the one or more signaling messages or pilots.

10. The apparatus of claim 1, wherein at least some of the one or more signaling messages or pilots are associated with the one or more bandwidths that are less than the threshold.

11. The apparatus of claim 1, wherein to compensate for the distortion, the at least one processor is further configured to perform the DPoD process associated with the one or more subsequent signals from the base station based on the identified combined PA and ET non-linearity model.

12. The apparatus of claim 1, further comprising a transceiver coupled to the at least one processor.

13. A method of wireless communication at a user equipment (UE), comprising:
   receiving, from a base station, one or more signaling messages or pilots;
   identifying a combined power amplifier (PA) and envelope tracking (ET) non-linearity model associated with the base station based on the one or more signaling messages or pilots; and compensating for a distortion in one or more subsequent signals from the base station based on the identified combined PA and ET non-linearity model, the distortion being associated with a PA circuitry and an ET circuitry, the PA circuitry and the ET circuitry being associated with the base station; and wherein at least one of:

the one or more signaling messages or pilots include an indication of an ET non-linearity model, and wherein the ET non-linearity model corresponds to a filter response model associated with the ET circuitry associated with the base station;

the one or more signaling messages or pilots are associated with a plurality of power levels, and further comprising estimating a threshold envelope value associated with the ET circuitry being enabled or disabled based on the one or more signaling messages or pilots;

at least some of the one or more signaling messages or pilots are associated with one or more bandwidths that are less than a threshold; or compensating for the distortion comprises performing a digital post-distortion (DPoD) process associated with the one or more subsequent signals from the base station based on the identified combined PA and ET non-linearity model.

14. The method of claim 13, wherein the one or more signaling messages or pilots include an indication of a PA non-linearity model, and the PA non-linearity model is associated with an input signal or an instantaneous power supply voltage.

15. An apparatus for wireless communication at a base station, comprising:
memory; and
at least one processor coupled to the memory and configured to:
identify one or more signaling messages or pilots usable for identifying a combined power amplifier (PA) and envelope tracking (ET) non-linearity model associated with the base station, the combined PA and ET non-linearity model being associated with a PA circuitry and an ET circuitry, the PA circuitry and the ET circuitry being associated with the base station; and
transmit, to a user equipment (UE), the one or more signaling messages or pilots, and wherein at least one of:
the one or more signaling messages or pilots include an indication of an ET non-linearity model, and wherein the ET non-linearity model corresponds to a filter response model associated with the ET circuitry associated with the base station;
the one or more signaling messages or pilots are associated with a plurality of bandwidths, and the one or more signaling messages or pilots are usable for estimating one or more ET characteristics associated with the base station;
the one or more signaling messages or pilots are associated with a plurality of power levels, and the one or more signaling messages or pilots are usable for estimating a threshold envelope value associated with the ET circuitry being enabled or disabled;
at least some of the one or more signaling messages or pilots are associated with one or more bandwidths that are less than a threshold; or the at least one processor is further configured to:
transmit, to the UE, a first set of pilots of the one or more signaling messages or pilots with the ET circuitry disabled, the first set of pilots being usable for identifying a PA non-linearity model; and transmit, to the UE, a second set of pilots of the one or more signaling messages or pilots with the ET circuitry enabled, the second set of pilots being, in combination with the PA non-linearity model, usable for identifying the combined PA and ET non-linearity model.

16. The apparatus of claim 15, wherein the one or more signaling messages or pilots include an indication of a PA non-linearity model, and the PA non-linearity model is associated with an input signal or an instantaneous power supply voltage.

17. The apparatus of claim 16, wherein the PA non-linearity model corresponds to a lookup table (LUT) or one or more Volterra kernels.

18. The apparatus of claim 15, wherein the ET non-linearity model corresponds to the filter response model associated with the ET circuitry associated with the base station.

19. The apparatus of claim 15, wherein the one or more signaling messages or pilots include the indication of the one or more characteristics of TX signal processing associated with the base station.

20. The apparatus of claim 15, the at least one processor being further configured to:
transmit, to the UE, the first set of pilots of the one or more signaling messages or pilots with the ET circuitry disabled, the first set of pilots being usable for identifying the PA non-linearity model; and
transmit, to the UE, the second set of pilots of the one or more signaling messages or pilots with the ET circuitry enabled, the second set of pilots being, in combination with the PA non-linearity model, usable for identifying the combined PA and ET non-linearity model.

21. The apparatus of claim 15, wherein the one or more signaling messages or pilots are associated with the plurality of bandwidths, and the one or more signaling messages or pilots are usable for estimating one or more ET characteristics associated with the base station.

22. The apparatus of claim 15, wherein the one or more signaling messages or pilots are associated with the plurality of power levels, and the one or more signaling messages or pilots are usable for estimating the threshold envelope value associated with the ET circuitry being enabled or disabled.

23. The apparatus of claim 15, wherein at least some of the one or more signaling messages or pilots are associated with the one or more bandwidths that are less than the threshold.

24. The apparatus of claim 15, further comprising a transceiver coupled to the at least one processor.

25. A method of wireless communication at a base station, comprising:
identifying one or more signaling messages or pilots usable for identifying a combined power amplifier (PA) and envelope tracking (ET) non-linearity model associated with the base station, the combined PA and ET non-linearity model being associated with a PA circuitry and an ET circuitry, the PA circuitry and the ET circuitry being associated with the base station; and
transmitting, to a user equipment (UE), the one or more signaling messages or pilots, and wherein at least one of:

the one or more signaling messages or pilots include an indication of an ET non-linearity model, and wherein the ET non-linearity model corresponds to a filter response model associated with the ET circuitry associated with the base station;

the one or more signaling messages or pilots are associated with a plurality of bandwidths, and the one or more signaling messages or pilots are usable for estimating one or more ET characteristics associated with the base station;

the one or more signaling messages or pilots are associated with a plurality of power levels, and the one or more signaling messages or pilots are usable for estimating a threshold envelope value associated with the ET circuitry being enabled or disabled;

at least some of the one or more signaling messages or pilots are associated with one or more bandwidths that are less than a threshold; or further comprising: transmitting, to the UE, a first set of pilots of the one or more signaling messages or pilots with the ET circuitry disabled, the first set of pilots being usable for identifying a PA non-linearity model; and transmitting, to the UE, a second set of pilots of the one or more signaling messages or pilots with the ET circuitry enabled, the second set of pilots being, in combination with the PA non-linearity model, usable for identifying the combined PA and ET non-linearity model.

26. The method of claim 25, wherein the one or more signaling messages or pilots include an indication of a PA non-linearity model, and the PA non-linearity model is associated with an input signal or an instantaneous power supply voltage.

27. The method of claim 26, wherein the PA non-linearity model corresponds to a lookup table (LUT) or one or more Volterra kernels.

* * * * *